United States Patent
Page

[15] 3,681,746
[45] Aug. 1, 1972

[54] LONG RANGE OBSTACLE LOCATOR SYSTEM

[72] Inventor: Robert M. Page, Camp Springs, Md.

[73] Assignee: The United States of America as represented by the Secretary of the Navy

[22] Filed: Jan. 2, 1952

[21] Appl. No.: 264,627

[52] U.S. Cl. ................. 340/3 R, 343/11, 343/17.1 R
[51] Int. Cl. ................................................. G01s 9/68
[58] Field of Search ....343/9, 5, 11, 17.1 R; 340/1 R, 340/3 R, 6 R

[56] References Cited

UNITED STATES PATENTS

| | | | |
|---|---|---|---|
| 2,505,587 | 4/1950 | Smith | 340/3 R |
| 2,536,771 | 1/1951 | Rost et al. | 340/3 R |
| 2,473,974 | 6/1949 | Schuch | 340/3 R |

Primary Examiner—Richard A. Farley
Attorney—G. H. White and W. R. Maltby

EXEMPLARY CLAIM

8. In an echo energy operative object locator system, means generating pulses of oscillatory energy of finite duration, directive energy emission means for emitting the generated energy in a narrow beam, means for rotating said directive energy emission means at a rate providing several revolutions thereof during each pulse to thereby subdivide each pulse into a group of short duration pulses with the individual pulses of said group separated by periods greater than the pulse duration of said individual pulses, directive reception means for intercepting echo energy pulses returned by an object, means for storing the intercepted short duration echo energy pulses occurring over a period of time, control means for regulating the reproduction of stored echo energy pulses wherein the time separation between the individual reproduced pulses is reduced to less than the duration of the individual reproduced pulses, and narrow bandwidth frequency selective means responsive to the reproduced pulses for combining reproduced pulse energy occurring over a period of time.

12 Claims, 6 Drawing Figures

LONG RANGE OBSTACLE LOCATOR SYSTEM

This invention relates to echo energy operative object locator systems in general and in particular to locator systems of the sonar type which are operative with energy having low propagational velocity.

In conventional locator systems the pulse-echo technique has become widely known. Briefly described such as a requires the emission of short duration bursts or pulses of energy in a very narrow beam. If such emitted energy strikes an energy reflective object, a portion of that energy that is reflected and can be picked up at the emission point and amplified by a sensitive receiver. Energy thus received will be delayed with respect to the emitted energy because of the time consumed in propagation out to the reflective object and back. Thus it is a relatively simple matter to determine the range of an energy reflective object by measuring the time consumed in transmission and to determine the bearing of the object by noting the direction of energy emission and reception. This operation may be repeated for all directions from the emitting locality merely by rotating the direction of emission and reception at a rate which is slow enough to permit the reflection of emitted energy from the maximum usable range. Such operation is quite easy to obtain in radar systems, even at long range, because the velocity of propagation of radio frequency energy is sufficiently high so as not to introduce excessively large time delays. On the other hand, in sonar systems (underwater sound) the relatively slow velocity of propagation of elastic waves (about 5,000 feet per second) is a very definite and serious limitation particularly where long ranges are involved. For example, where a range of 40,000 yards is desired the total two-way transmission time is approximately 48 seconds. It is therefore apparent that only extremely low search rotational speeds could be utilized, typically as slow as one or two revolutions in an hour. Such a low rotational rate means very infrequent sampling of the range and bearing of reflective objects which possess motion relative to the locator system. Thus the average accuracy is low with the result that high speed objects can approach quite close to the locator system in the time lapse between sampling periods as necessitated by the rotation of the emission and reception apparatus. Such inherent limitations in conventional systems are therefore highly undesirable.

It is accordingly an object of the present invention to provide an echo energy operative object locator system capable of long range operation.

Another object of the present invention is to provide an echo energy operative object locator system suitable for long range operation particularly in media having low propagational velocity characteristics.

Another object of the present invention is to provide an echo energy operative object locator system for area searching in which range limitation is not imposed by the rotational velocity of the energy emitter and receiver, and rotational velocity limitation is not imposed by range requirements.

Another object of the present invention is to provide and echo energy operative object locator system for operation in low propagational velocity media employing signal storage and integration techniques for the extension range.

Other and further objects and features of the present invention will become apparent upon a careful consideration of the accompanying drawing and following detailed description.

In accordance with the principles of the present invention, a locator system is provided which is intended primarily for operation in a medium having low velocities of energy propagation. An illustration of such a medium is sea water. The system of the present invention is fundamentally of the pulse-echo type, the basic principles of which as employed for bearing and range determinations are well known in the art. The present system involves many variations over the prior art in order to made use of improvement in signal to noise ratio afforded by signal storage and integration in narrow bandwidth amplifier circuits. In particular a first transducer is employed for handling long duration pulses of oscillatory energy. This first transducer preferably is an energy emitting device although if adequate provision is made it may be an energy reception device. Cooperative with this first transducer are secondary transducers which preferably are receiving transducers having fixed positions with individual reception beam widths and total numbers sufficient to cover the entire desired total angle of search. The first transducer is provided with rotation at a relatively high speed so that it can make many, e.g. 50, revolutions during each pulse of energy emitted thereby. Thus with the first transducer being employed for energy emission and and the secondary transducers being employed for reception whenever an energy reflective object is encountered, the high speed rotation of the first transducer "chops up" each pulse of energy emitted in any one direction into a series of short duration pulses. Upon reflection by the object therefore the received pulses are also of the form of groups of short duration pulses. These signals when received by the secondary transducers and amplified individually are stored in carrier waves individually, then played back in rapid correlated sequence and integrated additively. Thus the carries wave energy contained in all of the short duration pulses can be added to provide high sensitivity.

Figure 1:
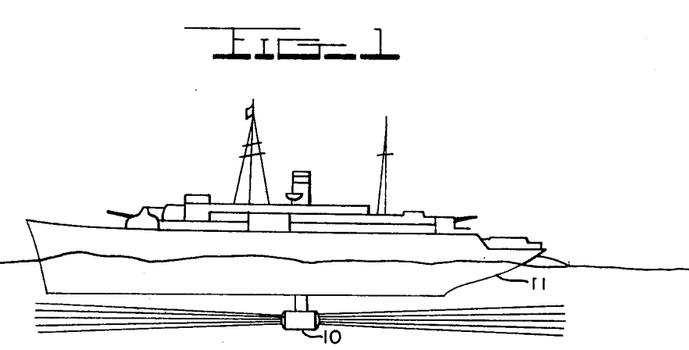
FIG. 1 shows a ship carrying a locator system constructed in accordance with the principles of the present invention.

With particular reference now to the showing of FIG. 1 a ship is indicated therein on which is carried a sonar system embodying the features of the present invention. The only portion of the sonar system visible in this figure is the "dome" 10 projecting from the bottom of the vessel 11. As is more or less customary practice in such installations, this dome 10 is merely a protective cover within which the transducer energy emission element or elements are mounted. The dome 10 is "transparent" to the signal energy employed by the system, serving primarily to protect the transducer elements from underwater damage. As is customary in such installations, and to further reduce the possibility of damage to the transducer, provision would normally be made to withdraw the entire dome 10 and its contents into the vessel during periods of inactivity. Such is not essential to the operation of the apparatus in accordance with the teaching of the present invention, however.

Figure 2:
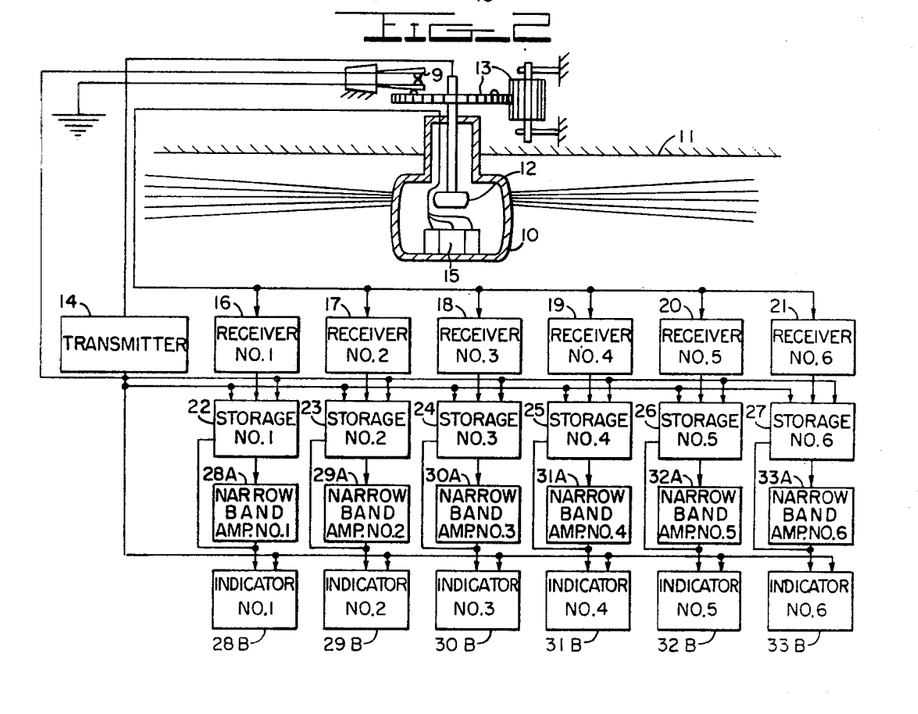
FIG. 2 is a schematic diagram principally in block form of a locator system constructed in accordance with the features of the present invention.

FIG. 2 shows additional details of the transducer elements mounted within the dome 10 together with block diagrammed components cooperative therewith. The dome is shown in FIG. 2 as extending partly within the bottom of the vessel which is indicated by the dotted cross-sectional portion 11.

Within the dome 10 is mounted a transmitting transducer 12. Transducer 12 is suitably journalled for rotation which may be provided for example through the gearing 13. Transducer 12 in the typical system would have bilateral energy emission characteristics, emitting energy in two diametrically opposed beams each having typical beam widths of 12°. Rotation of transducer 12 is at a typical rate of 200 revolutions per minute.

Energy for emission by transducer 12 is provided by transmitter 14 having a typical operational frequency of 5,000 cycles per second. This energy is of a long pulse characteristic having a typical pulse duration of 15 seconds. The repetition frequency of these pulses is typically 1 to 2 pulses per minute.

Also within the dome 10 is mounted a plurality of receiving transducers 15, fixedly positioned. These receiving transducers are selected in number and beam angle to cover the entire field of search. For example, in a typical situation with a field of search of 360°, six receiving transducers each having a bean angle of 60° may be employed.

Signals picked up individually by the six receiving transducers are applied independently to six receiver systems for separate amplification. These receiver systems are identified by the numbers 16, 17, 18, 19, 20 and 21. All receivers may be identical and need be of no special design, the only requirement being that they have sufficient bandwidth for the signals involved as will be described later.

Receiver output signals are stored separately in the six storage devices 22–27 and subsequently are reproduced for integration in tuned narrow bandwidth amplifiers 28-A to 33-A and presentation by the indicators 28-B to 33-B.

To summarize typical characteristics previously given as well as provide additional ones, with rotation of the transmitting transducer 12 at 200 r.p.m. and a 15 second pulse signal duration, the transducer will be energized during each pulse for 50 revolutions of the transducer. With bi-directional energy radiation, as transducer 12 rotates at 200 r.p.m. any target or energy reflective object located in the energy path will receive energy in incremental pulses at the rate of 400 per minute or 6⅔ per second. The incremental pulses received by the target during each long emitted pulse, assuming a typical beam angle of 12° for transducer 12, will have a duration of the order of 0.01 sec and will total 100 (50 bi-directional revolutions). Such energy delivery will take place to any range throughout the 360° of azimuth.

The net result of such energy radiation is the production of a wave pattern in the propagation medium which at any one instant is a double spiral of 50 foot wide bands of excitation which are separated by 700 feet giving an interval of 750 feet, or 375 range-feet. The double spiral progresses outward with time and, because of the 15 second pulse duration, has a maximum total width of 75,000 feet or 25,000 yards. The wave pattern moves out from the transducer 12 to a distance of about 40,000 yards in 24 seconds, or 40,000 range yards in 48 seconds. The excitation duty factor for each 750 foot interval or 375 range-foot interval will be 1/15 and in the 15 second total pulse duration, a total of 1 second of actual excitation is obtained an any one range. This information is contained in many short incremental pulses hardly usable individually but which can be integrated to combine all the pulse energy. Such integration can be provided with the assistance of received signal storage techniques.

The energy thus emitted is received in one or more of the six 60° sectors after reflection by distant reflective objects, and stored separately for each sector. Because the reception and storage for all sectors may be identical, the following discussion of one receiver and the associated components will suffice for all.

The receiver 16 amplifies the signals picked up by the appropriate receiving transducer 15 and delivers them to the storage device 22. Neglecting doppler frequency shifts for the present, the received signals will be at the emitted frequency of 5 kc per second which frequency is recorded or stored directly. The signal storage device 22 is preferably of the electronic type wherein signals are retained as electron concentration variations on some storage medium within a tube envelope. The signals are stored in the form of variations in successive lines which together cover a large area similar to that for example as employed in a television picture. The area is covered by a plurality of lines, one displaced from the other, to give a maximum of available storage area. Storage is made with 100 lines on the face of the tube, each line representing a time duration of 0.15 second or 375 feet in range. Recording is made substantially continuously, a line at a time, with the oldest line of the 100 being erased just prior to signal storage of new information on the line. The overall result of this form of storage is to record range progressively in 375 foot intervals at a rate of 100 intervals in a 15 second period.

Thus in any one group or frame of 100 lines there is stored 37,500 feet of range. Since the incremental outgoing signals are spaced 375 range feet apart, upon encountering an object and being reflected thereby, the returning incremental echoes will be 375 range feet apart, and each will be stored in the same relative position on the respective 375 root range interval line during which it arrives. The points of storage of the several incremental echoes will thus be aligned vertically, and when the group of lines is scanned in such a way as to integrate all of these vertically aligned incremental echo signals, the result will be a recovery of a substantial echo signal, providing an easily detected indication of object presence.

The recorded or stored signals may be scanned to integrate vertically aligned increments by playing back successively, in short duration elements, the same relative portion of every 375 foot storage line, similar to the principles originally taught in my copending application, Ser. No. 155,772 filed Apr. 13, 1950, entitled "Search Radar System" now U.S. Pat. No. 3,266,037. In that system, signals received responsive to a plurality of successive emitted transmitter pulses were stored over an extended period of time. These signals were then played back in range increments, each increment being a small fraction of the total stored range interval. The playback was such that the selected range increments, the same for all pulses, were reproduced in rapid succession so that echo signals present at the selected range increment for all range intervals were additive from pulse to pulse. A range sweep was provided so that the "incremental" manner, the entire stored range interval was scanned.

Likewise in the present invention the 100 stored lines, each representing a 375 foot range interval in a total range of 37,500 feet, are played back in groups of small increments, typically of approximately 5 foot length, with the range increments selected for playback in any one group being the same relative range increment in each stored range interval. Sweep of the selected range increment is provided so that successive groups will consist of successive increments and the entire range represented by the one hundred stored lines can be analyzed. The whole 100 line frame is scanned after the addition of each new line, i.e. every 0.15 seconds.

With the signal storage and playback occurring as just outlined, each of the storage blocks 22 through 27 would include a suitable storage device as well as controls therefor of the same general character as exemplified in the received signal recording and reproducing apparatus in my above-mentioned copending application.

Figures 3, 4:
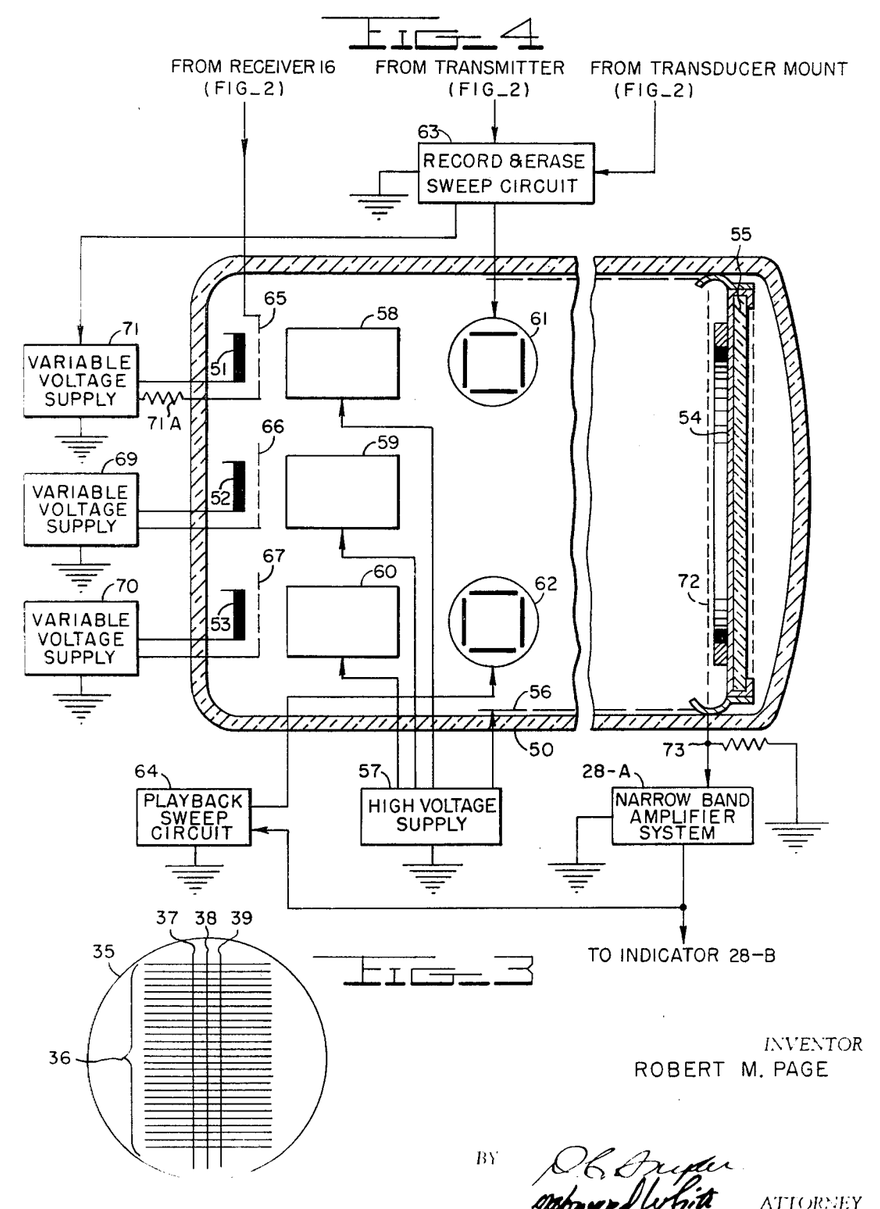
FIG. 3 shows a picturization of stored signals as they would be retained in the system of FIG. 2. This figure represents lines of electrons which are not of necessity visible in the actual apparatus.
FIG. 4 shows in partly schematic form a typical storage device as could be employed in the apparatus of the present invention.

To assist in the comprehension of the playback scheme, FIG. 3 has been included. This figure is similar to that in FIG. 4-B of the above-mentioned copending application and shows a circular area 35 such as would ordinarily be present in an electronic signal storage device, on which is placed a plurality of horizontal lines indicated generally by the numeral 36. These lines represent the 100 signal storage lines each corresponding to a 375 foot range interval as previously described, although it must be realized that for purposes of clarity, only 27 lines have been shown. In the showing of FIG. 3, the top horizontal line may represent, for example, the first 375 foot range interval following the start of the 15 second transmitter pulse, the line second from the top, the second 375 foot interval and so on. After the recording of 100 such lines, the top horizontal line is erased to make way for the storage of the 101st line and so on.

Playback of signals thus stored is in range increments typified in FIG. 3 as the space between the imaginary vertical lines 37,38. Thus the portion of the top horizontal line between lines 37 and 38 will be played back first, then immediately thereafter the portion of the second horizontal line between the vertical lines 37 and 38, and so on. Following the playback of the portion of the bottom line between lines 37 and 38, rapid flyback to the top line occurs for playback of the portion of the top line in the next increment between lines 38 and 39, then the portion of the second horizontal line between lines 38 and 39, and so on. In this stepwise manner the entire 375 foot length of all lines is covered. As stated heretofore, the playback sweep circuits are so designed that the entire 100 line frame is scanned after the addition of each new line of recorded signals.

Playback signals thus obtained are integrated in narrow bandwidth amplifiers 28-A through 33-A which preferably are of the inductance-capacitance tuned variety capable of signal amplitude build-up responsive to successive applied signals at the tuned frequency. These amplifiers individually receive the output from corresponding storage devices to provide separate outputs for the indicators 28-B through 33-B.

The indicators 28-B through 33-B may assume different forms to fulfill specific requirements. In perhaps the simplest form they may be merely galvanometric devices operative to indicate by deflection of a pointer, the presence of a signal output from an integrating amplifier. Another form which the indicators may assume is that of a conventional type A presentation, i.e. a cathode ray tube device having beam deflection in two mutually perpendicular axes one of which is provided with a time base sweep initiated at the start of each 15 second pulse and having a duration of approximately 30 to 60 seconds. In such a system, deflection signals for the opposing axis are obtained as the output from one of the amplifiers 28-A through 33-A. With an arrangement such as this last described, a rough range indication may be derived from the time displacement between the start of each 15 second pulse until build-up signals from a narrow band amplifier are noticeable.

The locator system as thus described has limited bearing and range accuracy, because of the integrated signal build-up time and the wide reception angle of each of the few receiving transducers.

Both bearing and range accuracy can be improved, however, by extensions of the system not here described. Bearing accuracy may be improved, for example, by using the ratio of received signals in the beam patterns of two adjacent receiving transducers. Range accuracy may be greatly increased by a more complex signal display system in which received signals may be displayed in an unintegrated form. Excellent range resolution can also be provided, by reason of the small width, e.g. 25 range feet, of the transmitted incremental energy pulses.

Nevertheless the system as presently described has a substantial advantage over the prior art in providing for surveillance of a large area quickly, without the necessity of long scanning times usually associated with low propagation velocity media.

In the discussion thus far, only passing mention has been made of doppler frequency shifts due to relative motion between the ship carrying the system and an energy reflective object. Such frequency shifts can be substantial and must be given consideration. Recording and playback in the system as thus far described are at the same sweep rate, so that a 5,000 cycle received signal when recorded is reproduced as a 5,000 cycle signal which is delivered to a narrow bandwidth integrating amplifier in indicator 28. When relative motion exists the 5,000 cycle signal may be shifted in frequency due to doppler effect by as much as ± 100 cycles per second or ± 2 percent, and with a selected sweep rate is necessarily recorded at that frequency. If this signal is then played back at the same sweep rate as that used to recover 5,000 cycle signals, it will retain the ± 2 percent frequency shift. When delivered to the narrow bandwidth integrating amplifier circuit in the indicator, which may have a bandwidth of the order of 0.4 percent of its center frequency, the signal will be so far removed from the tuned frequency of the amplifier that no response will be obtained. This situation has several solutions but there is one solution that has distinct advantage in equipment simplicity and convenience of operation. For this solution, the playback sweep rate is altered to where it is different from the recording sweep rate so that the typical signal recorded with doppler frequency shift is reproduced at such a rate that it appears at the center frequency to which the narrow bandwidth amplifier is tuned.

This seemingly simple solution is complicated by the fact that there is no way of telling at what frequency an incoming signal is recorded. Thus it is necessary to search the entire frequency range over which incoming signals may be received until a frequency is found at which a reproduced signal (if there is a recorded signal) appears as a 5,000 cycle signal. Therefore in addition to the one range sweep of the stored signals after the recording of each line, additional range sweeps at different frequencies are also required. That is, the whole 100 line frame is scanned not only once after each new line has been added, to recover signals recorded as 5,000 cycle signals, but a plurality of times at incrementally varied sweep rates to recover all signals recorded within the entire prospective doppler frequency shift band. Thus if the integrating amplifier bandwidth is 9.4 percent of its center frequency, and the prospective range of reflected signal frequencies is from 4,900 to 5,100 cycles, or 4 percent, the frame must be scanned 10 times, at incrementally varied playback sweep rates, after each new line is recorded. With the entire frame required to be played back several times after the recording of each line, it is therefore apparent that the recorded signals must be played back many times. This necessitates a very high playback rate, because the several scans must be accomplished in 0.15 seconds. Ordinarily no difficulty will be experienced from this standpoint because the recorded signals are so low in frequency (nominally 5,000 cycles per second), while the electronic storage devices as employed herein are capable of operation with signals of several megacycles per second frequency. THe high speed playback does increase the frequency of reproduced signals however, so that the narrow bandwidth integrating amplifiers 28-A through 33-A ordinarily must have a center frequency many times the frequency of the received signals.

Because of the interdependency of the factors involved, a recapitulation of all quantities exemplified in a typical system will be given.

| | |
|---|---|
| Emitted Signal Frequency and Nominal Signal Frequency | 5,000 cycles per second |
| Pulse Duration 15 seconds | |
| Pulse Repetition Frequency | 1 to 2 per minute |
| Antenna Rotation Speed | 200 revolutions per minute |
| Length of Range Interval Stored | 375 feet |
| Increment of Range Interval | 5 feet |
| Increment Playback Sweep Rate | Nominally 500 kc |
| Frame Playback Sweep Rate | 66/ sec |
| Doppler Frequency Range | ± 100 cps |
| Doppler Rrange Sweep Rate | 6.66/sec. |
| Ratio of Playback Output Frequency To Signal Storage Frequency | 100 to 1 |

FIG. 4 shows in a partly schematic representation a typical storage tube with certain external connections such as would be employed in the storage device 22 of FIG. 2 of the present invention. The storage tube of FIG. 4 was originally described in a copending patent application in the name of A. V. Haeff, Ser. No. 768,790, filed Oct. 15, 1947 now U.S. Pat. No. 2,813,998 entitled "Method of Storing, Maintaining, and Reproducing Electrical Signals and Means Therefor", and will be described briefly herein.

In the apparatus of FIG. 4 the tube elements are mounted within an evacuated envelope 50. The tube has three electron beam assemblies identified by their cathodes 51, 52, 53. These beams are collected on an activated surface 54 typically of distributed willemite particles, supported by an insulator plate 55. An accelerating anode coating 56 is placed on a portion of the interior of the tube and is energized by a high voltage supply 57. Supply 57 also provides energizing for the beam focusing members 58, 59, 60.

The beams from cathodes 51 and 53 are focused to impinge on the activated surface 54 in a pinpoint whereas the beam from cathode 52 is focused broadly to supply a broad continuous flow of electrons to the entire activated surface.

Deflection of the pin-point beams from cathodes 51 and 53 is provided by suitable deflection means such as the plates shown in the drawing as enclosed within the circles 61, 62. By this deflection, the pin-points can be caused to impinge on any spot of the activated surface. Deflection signals are obtained from suitable sweep generator and amplifier circuits 63 and 64 which are also components of storage block 22 of FIG. 1.

The beams from all cathodes are controllable in intensity by conventional grid electrode members 65, 66, 67. Intensity modulation signals for the grid 65 would normally be obtained from some input source, for example, the receiver 16 of FIG. 2. Intensity modulation signals for the grids 66 and 67 are obtainable if desired from the variable voltage supplies 69 and 70. Similarly grid 65 may also receive intensity modulation signals from variable voltage supply 71. In addition to controlling grid voltages, the variable voltage supplies 69, 70, 71 may also provide variation of the potentials of cathodes 51, 52, 53. The necessity for such variations will be seen later as the process of signal storage and reproduction is explained.

A screen 72 possessing close spacing such as 200 mesh per inch is placed in close proximity to the activated surface 54 to collect secondary electrons emitted from the surface 54. This screen 72 is connected to an external terminal 73 from which may be obtained the output signals.

An initial charge distribution pattern representative of the signal to be stored may be placed on the active surface 54 by the electron beam from cathode 51. The beam energy may be controlled in intensity by the potential of the grid 65 while the deflection signals supplied to deflection means 61 place the beam at desired areas of the activated surface. In storage for the purposes of the present invention, the deflection means 61 provides deflecting signals in two mutually perpendicular axes so that a rectangular area may be covered very much as with the familiar television raster, however only one hundred horizontal lines will be present.

Signals thus placed on the activated surface 54 are maintained thereon for considerable periods of time, as long as desired, by the broadly focussed electron beam from cathode 52.

Retained signals are reproduced as electrical variations at the terminal 73 in the playback operation involving the electron beam from cathode 53. In this operation, the playback beam is caused to scan the stored signals in a regular sequence. This sequence is provided by the scanning signals applied to the deflection means 62. Thus as electrons from cathode 53 impinge on the stored signals (electron) on (electrons) 54, secondary electrons are dislodged therefrom in dependency on the stored signals. These secondary electrons when collected by the screen 72 comprise the output signals.

Signals thus stored as concentration variations of electrons on the surface 54 may be erased in a line by line manner by adjusting the balance between the primary electrons delivered to the surface 54 from cathode 51 and the secondary electrons leaving surface 54. Thus by proper alteration of the electrode voltages existing on the tube, stored signals may be "erased".

In actual operation of the tube there is a critical voltage condition (between the cathode and the activated surface 54) for optimum recording (storage), as well as another critical voltage therebetween for optimum erasing. In the erasing operation the effectiveness or rapidity with which complete erasing may be accomplished depends upon the beam current hence a higher beam current will in general provide more effective erasure.

With the particular tube structure shown it is possible to achieve line by line erasure with the electron beam from either cathode 51 or 53; however, in the particular application with the apparatus of the present invention it is generally preferable to employ the beam from cathode 51, normally considered the record beam, for erasure also.

For erasure the potential of screen 72 is ordinarily held constant while the potential of cathode 51 is shifted in any suitable manner to provide the critical erasing voltage between cathode and screen. Simultaneously the grid bias is reduced to increase the beam current for greater erasing effectiveness. As a general proposition the potential difference between cathode and screen is less for erasure then for recording.

Figure 5:
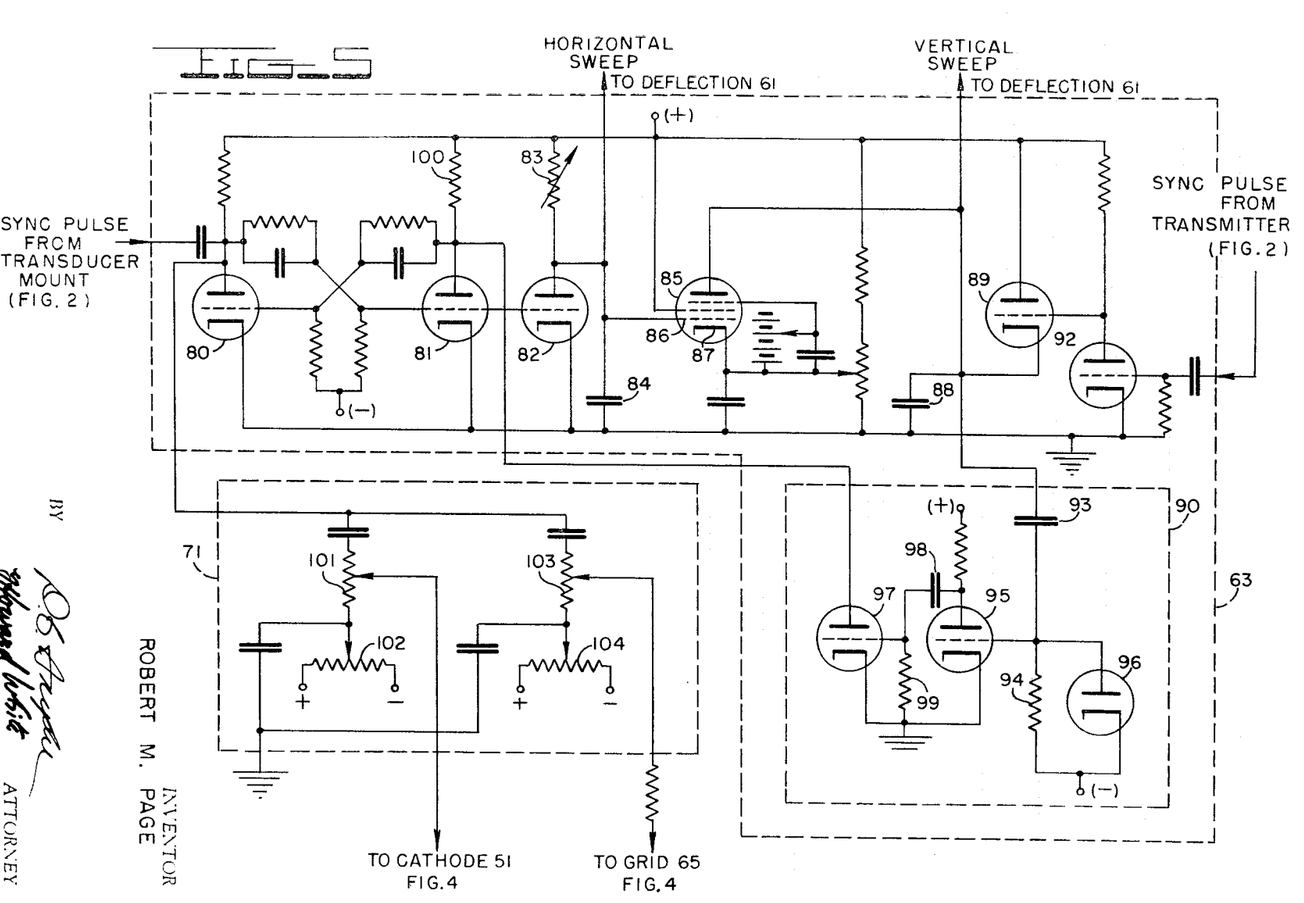
FIG. 5 shows details of typical signal storage and erase circuits employed in the apparatus of FIG. 4.
Figure 6:
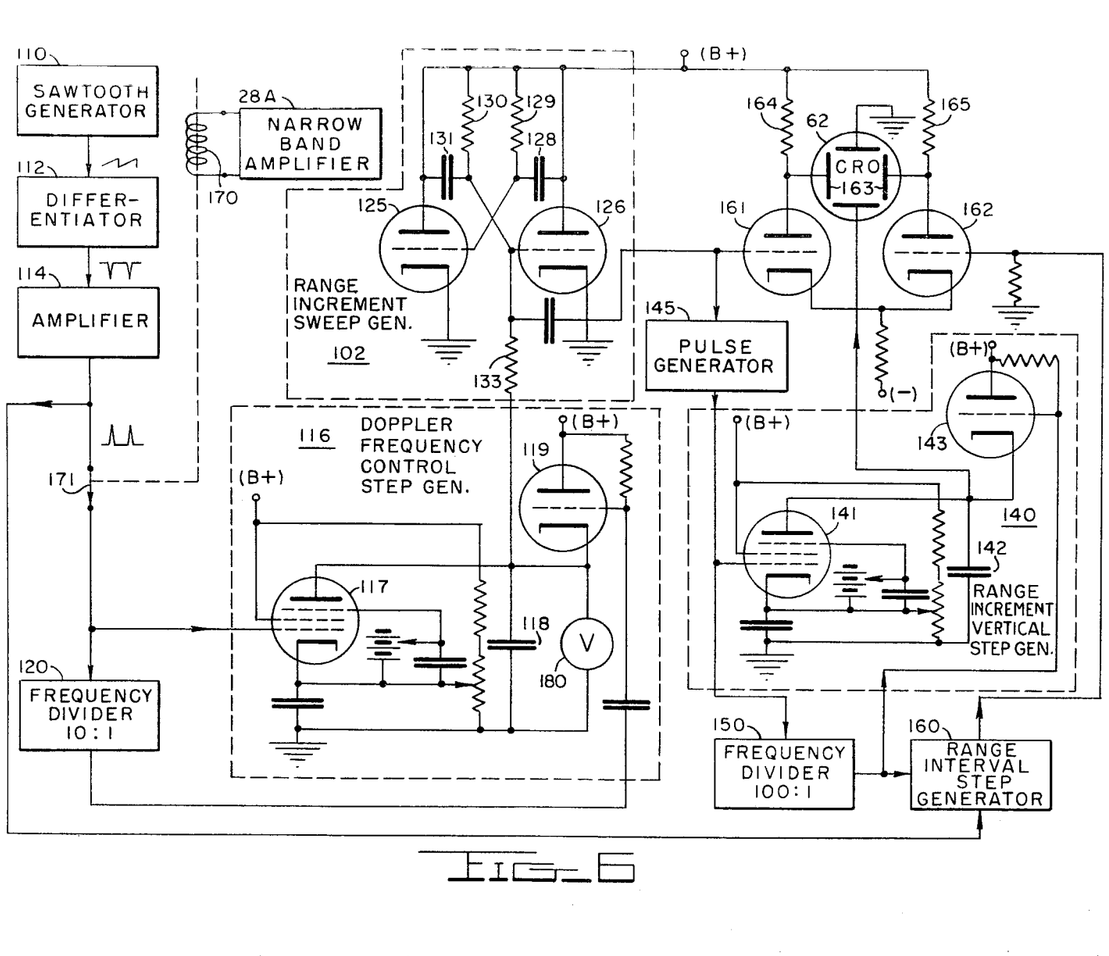
FIG. 6 shows details of typical signal integration sweep circuits employed in the apparatus of FIG. 4.

To assist in an appreciation of the overall features of the present invention, the additional FIGS. 5 and 6 have been included. These figures show in detail elements of the circuitry necessary to store and integrate the information received by one of the six receiving transducers. It should be understood, however, that the circuitry of these diagrams is primarily exemplary and is not necessarily the most desirable from every point of view.

Components of the block 63 of FIG. 4, the horizontal and vertical record and erase sweeps, are shown in FIG. 5. This circuit includes a trigger circuit of tubes 80 and 81 which is of the Eccles-Jordan type having two stable states. One stable state with tube 80 conductive is brought about by the application of a negative pulse to the anode of tube 80. The other stable state with tube 81 conductive is brought about by the application of a negative pulse to the anode of tube 81.

The grid of tube 81 is connected to the grid of tube 82 which together with resistance 83 and capacitance 84 forms a sawtooth generator circuit, wherein a sawtooth waveform may be produced across capacitance 84 at a frequency of 6.66 cycles per second.

Switch tube 85, of the pentode variety, has its grid 86 coupled to the capacitance 84 and its cathode 87 tied to a source of positive voltage. Although with this type of connection tube 85 is normally held non-conductive the positive voltage applied to the cathode 87 is adjusted to a point such that tube 85 can be rendered conductive when a desired peak amplitude of voltage across capacitance 84 is reached.

The anode of tube 85 is connected to a capacitance 88, to the cathode of tube 89 and through amplifier 90 to the anode of tube 81. The anode of tube 89 is connected to B+ and the grid thereof to the anode of amplifier tube 92. The grid of tube 92 is connected to the transmitter 14 of FIG. 2 to receive therefrom a short duration negative pulse at the start of each 15 second transmitter pulse.

In operation of this circuit of FIG. 5 therefore, a negative pulse is supplied to the anode of tube 80 twice during each revolution of the emitting transducer 12 (FIG. 2) as supplied by a suitable switch mechanism 9 in the transducer mounting. The exact timing of these pulses, relative to the time the transducer emission is on the bearing of the receiver whose storage device they control, is not particularly important provided they occur at the repetition frequency of the transmitted incremental pulses. Thus the same two pulses per revolution of transducer 12 ordinarily may be employed for synchronizing the operation of the sweep circuits in all six storage blocks 22 through 27. If desired however, separate contacts spaced 60° may be supplied for each opposing pair of transducers. With each negative pulse thus obtained, tube 81 is cut off and with it tube 82 to permit the start of a sawtooth wave at 84. As each sawtooth progresses to the selected amplitude, tube 85 is unblocked to partially discharge capacitance 88. Capacitance 88 is thus discharged in a stepwise manner coincident with a preselected amplitude of charge on capacitor 84, and by virtue of the "constant current" characteristics possible with the pentode type tube 85, the "steps" are of nearly uniform amplitude. This stepwise discharge of capacitance 88 continues until the start of another 15 second transmitter pulse causes the application of a negative pulse to the grid of tube 92 which raises the grid of tube 89 and thereby rapidly charges capacitance 88. The 6.66 cps horizontal sweep signal of repetitive sawtooth waveform is obtained across capacitance 84, while the vertical sweep signal of stepwise waveform, containing 100 equal steps per 15 seconds, is obtained across capacitance 88.

The reset signal path from capacitance 88 to the trigger circuit of tubes 80-81 is shown as including an amplifier section 90. The requirements for this component are simple and straightforward, it merely being necessary to supply a reset signal to the trigger circuit to produce the horizontal retrace, by discharging capacitance 84, as soon as possible after a usable step is produced across capacitance 88. To this end, the signal from the capacitance 88 is differentiated in a short time constant circuit including capacitance 93 and resistance 94 and applied to a tube 95 which is normally conducting. The negative peak corresponding to each vertical "step" drives the grid of tube 95 below cut-off to produce a positive pulse at the anode of tube 95. To assist in this operation it may be desirable in certain circuit combinations to place a unilateral impedance element 96 such as a thermionic diode or a crystal diode across resistance 94 polarized to prevent the application of positive signals to the grid of tube 95. Additionally tube 95 may be supplied with a negative biasing voltage through resistance 94. Alternatively in certain instances it may be desirable to eliminate the element 96 and the bias supply, returning resistance 94 to ground directly.

Positive signals thus obtained at the anode of tube 95 are applied to a clipper amplifier 97 through the long time-constant coupling circuit of capacitance 98 and resistance 99. With positive signals applied in this manner, conduction by the grid of tube 97 on the peaks of the positive signals results in the development of a grid-leak biasing voltage so that tube 97 is rendered non-conductive except on the peaks of the signals from the anode of tube 95. In this manner therefore, negative pulses are produced at the anode 97 across the resistance 100 which is shared by that tube and the tube 81 of the trigger circuit. Negative keying pulses thus applied to the trigger circuit bring about the condition in the circuit wherein tube 81 is conductive. This discharges capacitor 84 quickly, producing a high speed horizontal flyback.

It has thus been explained how the sweep signals are produced for the recording and erasure phases of signal storage and reproduction. The necessary signals to control electrode potential of the tube gun including cathode 51 and grid 65 may be obtained from the trigger circuit of tubes 80 and 81 realizing the conditions of the circuit during the horizontal forward sweep (record) wherein tube 80 is conductive and in the horizontal flyback sweep (erase) wherein tube 81 is conductive. Thus it has been mentioned that the potential difference between cathode and screen is less for erasure than for recording and that a higher beam current is desired during erasure than during recording. Such variation may be obtained in many ways, typically as shown in FIG. 5 with components in block 71. The cathode potential variation is obtained from the anode of tube 80. By adjustment of the potentiometer 101 the amount of variation applied to cathode 51 between the "record" and "erase" phases may be selected while potentiometer 102 permits an adjustment of the average d-c potential of the element. Similarly the variation for the grid 65 is obtained from the anode of tube 80 in variation amplitude dependency on the setting of potentiometer 103 and in average voltage dependency on the setting of potentiometer 104. To fulfill the requirements stated above, it would be expected that the setting of the variable taps of potentiometers 101 and 103 would be such as to apply a larger variable positive signal to the grid 65 during erasure than that applied to the cathode 51, to increase the beam current.

Such an arrangement for the components of the variable voltage supply 71 is here illustrated in perhaps its simplest form. In other forms it may include in addition electronic amplifiers. In thus connection it may be mentioned that the resistance 71-A is a form of isolating resistance to assist in the development of signals from signal source 68 at the grid 65. Again this is shown to illustrate requirements rather than give actual circuitry because in many instances the potentiometer 103 itself may provide sufficient resistance for coupling purposes if such is needed. The variable voltage supplies 69 and 70 of FIG. 4 may assume any form suitable for adjusting the beam currents of cathodes 52 and 53. For this purpose any biasing arrangement such as a variable cathode resistor or biasing battery, etc. may be used.

Illustration of the general requirements for the playback sweep circuit (64 in FIG. 4) is given by FIG. 6. This circuit includes a sawtooth generator of conventional design depicted in block form at 110. The output sawtooth waveform from generator 110 has a frequency of 66.6 cycles per second, or a periodicity of 15,000 microseconds. This output is differentiated in a differentiator of conventional design shown in block form at 112, to produce sharp negative pulses spaced 15,000 microseconds apart. The sharp pulses are amplified and inverted in amplifier 114 and utilized to trigger a step generator 116. Step generator 116 is of a design identical with the step generator 85, 88, etc. of FIG. 5. It consists of a pentode 117, capacitance 118 and reset switch tube 119, connected in identical manner as the pentode 85, capacitance 88 and tube 89 of FIG. 5. As explained in connection with FIG. 5, capacitance 118 is progressively discharged through pentode 117 by successive equal increments responsive to the application of successive positive pulses from amplifier 114. This produces a stepwise voltage across capacitance 118, each step of which has a 15,000 microsecond duration. Capacitance 118 should be of high quality, capable of maintaining a fixed charge for a considerable period of time, for reasons which will appear more fully hereafter. Upon application of a positive pulse to the grid of reset switch tube 119 this tube fires and recharges capacitance 118 abruptly, in preparation for the generation of another series of 15,000 microsecond steps. This reset pulse to be applied to the grid of tube 119 is derived by feeding the pulses from amplifier 114 through a ten to one frequency divider of conventional design, shown in block form at 120. The output of divider 120 is fed to the grid of tube 119, so that step generator 116 is reset after ten steps, or 150,000 microseconds.

The circuit of FIG. 6 includes a free running multivibrator sawtooth generator combination having the tubes 125-126. The time constants of this circuit are arranged to provide very unsymmetrical recurrent operation wherein tube 125 is conductive for practically the entire time. To this end, the time constant of the circuit of resistance 129 and capacitance 128 is made very small in comparison to the time constant of the circuit of resistance 130 and capacitance 131. Additionally, the resistance 129 is returned to a highly positive potential to further reduce the duration of the "off" period of tube 125. The grid resistor 133 of tube 126 is returned to capacitance 118.

With such an arrangement there is produced at the grid of tube 126 a truncated sawtooth waveform, the slope of which varies as the magnitude of the step voltage across capacitance 118. This signal is suitable for use as the playback range increment sweep signal. The 15,000 microsecond step voltage from step generator 116 is therefore suitable for use as the playback doppler frequency control voltage, controlling the slope of the truncated sawtooth at the grid of tube 126, and providing a different range increment sweep speed every 15,000 microseconds, or ten different range increment sweep speeds during every 0.15 second recorded line.

Since each range increment sweep corresponds to 5 feet of recorded signals, and each recorded line represents a 375 feet range interval, there are 75 range increments per range interval. Also since there are 100 range interval lines making up a complete recorded frame, it will be seen that 7,500 range increment sweeps must be generated to complete a single playback of the entire recorded frame.

It is the function of the playback range interval sweep to position suitably the successive range increment sweeps so that each range increment sweep of the 7,500 will cover its proper portion of the whole frame.

This is accomplished as follows. The range increment sweep voltage is fed to a range increment vertical step generator 140 which consists of pentode 141, capacitance 142 and reset switch tube 143. As explained in connection with the vertical sweep step generator 85, 88, etc. of FIG. 5, capacitor 142 is progressively discharged through pentode 141 by successive pulses fed to its control grid. The input pulses to the grid of pentode 141 are derived from the range increment sweep signal in a pulse generator of conventional design, shown in block form at 145. These pulses are therefore of the same frequency as the range increment sweep, and so phased that capacitor 142 discharges one step at the end of each range increment sweep. The step voltage thus produced across capacitor 142 is coupled to the vertical deflecting plates for the playback scanning beam of the storage device.

Pulses fed to pentode 141 at the frequency of the range increment sweep are also put through a 100 to 1 frequency divider 150 of conventional design. This frequency divider provides one output pulse for every 100 input pulses, which pulse fires reset switch tube 143 to recharge capacitor 142 abruptly, causing the playback scanning beam to flyback vertically.

Thus it may be seen that successive range increment sweeps are displaced progressively from the top line of the frame to the bottom or one hundredth line, and then vertically reset to repeat their stepwise vertical displacement.

Provision must also be made for lateral or horizontal progression of the range increment sweeps across the entire 375 range interval. This horizontal progression is accomplished also in a step-wise fashion, as will now be explained.

The output of frequency divider 150 is utilized to control another step generator 160, identical in design with step generator 140 above described, and therefore depicted only in block form. The output of step generator 160 is a step voltage having a step duration one hundred times as long as the step output of generator 140.

The step voltage from generator 160 is fed to the grid of tube 162 and thence to the horizontal deflection plates 163 for the playback scanning beam of the storage device. Thus after each 100 vertically aligned range increment sweeps, there is a vertical flyback of the scanning electron beam when capacitor 142 recharges, and simultaneously the range increment sweep locus is indexed horizontally to the next adjacent 5 foot range increment by the output from step generator 160.

After 75 horizontal steps, the range increment sweep locus will be at the right hand edge of the frame, and when the 100 vertically aligned range increments there have been scanned, the playback of the whole frame at that particular setting of the doppler frequency control voltage is complete.

The multivibrator sawtooth generator 125, 126, etc. is designed to be free running, and have an operating frequency not lower than that necessary to provide 7,500 range increment sweeps within the length of one 15,000 microsecond step of the doppler frequency control step voltage on capacitance 112. As this step voltage increases from its minimum value of zero, the rise time portion of the truncated sawtooth waveform at the grid of tube 126 will acquire a steeper slope, thereby shortening in time. This shortening of the duration of the rise time portion shortens the overall period of the multivibrator, so that 7,500 range increment sweeps will take less than the 15,000 microseconds provided by the step duration of the doppler frequency control voltage. It is undesirable to commence the next frame playback until the doppler frequency control voltage advances to the next step. Therefore the horizontal flyback or reset of the range interval step generator is delayed until the beginning of the next 15,000 microsecond step at capacitor 118.

Reset of the range interval step generator 160 is therefore controlled, in the manner of step generator 140, by a pulse coincident with the beginning of the next step of the doppler frequency control voltage across capacitor 118. This pulse may be obtained from amplifier 114.

Combination of the signals produced in the sweep circuits is effected in the dual input push-pull driver circuit of tubes 161-162. This circuit is familiar as the two tube cathode coupled phase inverter having a large cathode resistance with the cathodes of both tubes connected together to this resistance. Each anode has its separate load resistor. These resistors bear the numerical designations 164, 165. In such circuitry, a signal of positive polarity applied to the grid of one tube, say tube 162 will increase conductivity of tube 162 thereby dropping the potential at the anode of tube 162 and raising the potential of the interconnected cathode. With the cathode of tube 161 thus rising with respect to the grid thereof, tube 161 becomes less conductive to raise the potential at the anode of tube 161. This opposing action takes place with signals of either polarity applied to either tube 161 or 162. Push-pull signals thus produced at the anodes of tubes 161 and 162 are suitable for deflection of the playback electron beam by deflection means 62, (FIG. 4) to which they may be applied.

In one form of operation with this circuit, and in the absence of integrated output signals from the narrow band amplification system 28-A, all sweep circuits operate as thus far indicated. When a signal is obtained in the output of the narrow band amplifier 28-A, relay 170 is operated to open the switch 171 thereby stopping the charge and discharge of capacitance 118. As stated heretofore capacitance 118 is preferably of a high quality type and because of the low frequencies involved, is of large capacity. Thus in the absence of any shunting resistance across this capacitance it is capable of maintaining the charge which existed at the instant of operation of relay 170 for a considerable period of time. With the potential across capacitance 118 remaining constant, the range increment sweep speed remains constant at the proper value to maintain an input to amplifier 28-A at the frequency to which it is tuned.

At the instant of operation of the relay 170, a signal is given to the operator by the indicator 28-B typically by a pilot light actuated by a relay which is operated by the same signal controlling relay 170. When the signal is observed, the operator observes the voltage across capacitance 118 by a reading of the volt-meter. 180. The meter 180 may be calibrated in terms of doppler frequency shift, or in terms of range rate, as desired.

All components of the signal storage and integration system associated with receiver 16, which are at all unusual or particularly critical, have thus been exemplified or described in considerable detail both as to typical makeup and operation. As stated heretofore, the storage, integration and indicator components associated with each of the six receivers 16 through 21 are identical.

Thus there has been shown and described an object locator system in which high speed rotation of a single directive energy emission device is utilized to illuminate remote objects throughout the entire 360° of azimuth, in which object echo signals are received in one of a plurality of directive receivers corresponding to object azimuth, and suitably integrated to provide a sensitive indication of object presence and a rough indication of object range, and in which long range operation is achieved without limitation imposed by rotational velocity of the energy emission device.

While only a single embodiment of the present invention has been shown and described, it will be understood that many changes and modifications may be made therein without departing from the spirit of the invention, as defined by the appended claims.

The invention described herein may be manufactured and used by or for the Government of the United States of America for governmental purposes without the payment of any royalties thereon or therefor.

What is claimed is:

1. In an echo energy operative object locator system, means generating pulses of oscillatory energy of finite duration, directive energy emission means for emitting the generated energy in a narrow beam, means for rotating said directive energy emission means at a rate having a period of shorter duration than the duration of each generated pulse, directive reception means for intercepting echo energy returned by an object, and means for integrating received echo energy.

2. In an echo energy operative object locator system, means generating pulses of oscillatory energy of a finite duration, directive energy emission means for emitting the generated energy in a narrow beam, means for rotating said directive energy emission means at a rate having a period of the order of one fiftieth of the pulse duration, directive reception means for intercepting echo energy returned by an object, and means for integrating received echo energy received over a period of time.

3. In an echo energy operative object locator system, means for generating a pulse of wave energy, directive wave energy propagation means for emitting said generated wave energy, means for rotating said directive propagation means at a rate having a period small relative to the pulse duration to propagate on any one bearing a series of spaced increments of said pulse, a plurality of angularly disposed directive wave energy reception means for recovering echoes of said emitted energy, and integrating means associated with each of said reception means for integrating echoes of said pulse increments.

4. In an echo energy operative object locator system, means generating pulses of oscillatory energy of a finite duration, directive energy emission means for emitting the generated energy in a narrow beam, means for rotating said directive energy emission means at a rate having a period of shorter duration than the duration of each generated pulse, directional energy reception means having a restricted reception angle for intercepting echo energy returned by an object located within the reception angle, and means for integrating received echo energy.

5. In an echo energy operative object locator system, means generating pulses of oscillatory energy of a finite duration, directive energy emission means for emitting the generated energy in a narrow beam, means for rotating said directive energy emission means at a rate having a period of shorter duration than the duration of each generated pulse, a plurality of directional energy reception means each having a different reception field for separately intercepting echo energy returned from different directions, and a plurality of signal integrating means for separately integrating echo energy intercepted by the reception means.

6. In an echo energy operative object locator system, means generating pulses of oscillatory energy of a finite duration, directive energy emission means for emitting the generated energy in a narrow beam, means for rotating said directive energy emission means at a rate having a period of shorter duration than the duration of each generated pulse, a plurality of directional energy reception means each having a different reception field for separately intercepting echo energy returned from different directions, means for storing intercepted signals occurring over a selected period of time, means for controlling the reproduction of stored signals resultant to the reflection from an energy return object in rapid correlated sequence to obtain reproduced signals, and integrating means for adding reproduced signals.

7. In an echo energy operative object locator system, means generating pulses of oscillatory energy of finite duration, directive energy emission means for emitting the generated energy in a narrow beam, means for rotating said directive energy emission means at a rate providing several revolutions thereof during each pulse to thereby subdivide each pulse into a group of short duration pulses with the individual pulses of said group separated by periods greater than the pulse duration of said individual pulses, directive reception means for intercepting echo energy pulses returned by an object, means for storing the intercepted short duration echo energy pulses occurring over a period of time, control means for regulating the reproduction of stored echo energy pulses wherein the time separation between the individual reproduced pulses is reduced to less than the duration of the individual reproduced pulses, and integrating means responsive to the reproduced pulses for combining reproduced pulse energy occurring over a period of time.

8. In an echo energy operative object locator system, means generating pulses of oscillatory energy of finite duration, directive energy emission means for emitting the generated energy in a narrow beam, means for rotating said directive energy emission means at a rate providing several revolutions thereof during each pulse to thereby subdivide each pulse into a group of short duration pulses with the individual pulses of said group separated by periods greater than the pulse duration of said individual pulses, directive reception means for intercepting echo energy pulses returned by an object, means for storing the intercepted short duration echo energy pulses occurring over a period of time, control means for regulating the reproduction of stored echo energy pulses wherein the time separation between the individual reproduced pulses is reduced to less than the duration of the individual reproduced pulses, and narrow bandwidth frequency selective means responsive to the reproduced pulses for combining reproduced pulse energy occurring over a period of time.

9. In an echo energy operative object locator system, means generating pulses of carrier wave energy having a finite duration, directive energy emission means for emitting the generated energy in a narrow beam, means for rotating said directive energy emission means at a rate providing several revolutions thereof during each pulse to thereby subdivide each pulse into a group of short duration pulses with the individual pulses of said group separated by periods greater than the pulse duration of said individual pulses, directive reception means for intercepting echo energy pulses returned by an object, means for storing as carrier waves the intercepted short duration echo energy pulses occurring over a period of time, control means for regulating the reproduction in carrier waves of stored echo energy pulses wherein the time separation between the individual reproduced pulses is reduced to less than the duration of the individual reproduced pulses, and narrow bandwidth frequency selective means tuned to the nominal carrier wave frequency of reproduced pulse energy and responsive thereto to combine reproduced pulse energy occurring over a period of time.

10. In an echo energy operative object locator system, means for generating a pulse of wave energy, directive wave energy propagation means for emitting said generated wave energy, means for rotating said directive propagation means at a rate having a period small relative to said pulse duration to propagate on any one bearing a series of spaced increments of said pulse, a plurality of angularly disposed directive wave energy reception means for recovering echoes of said emitted energy, means for storing received echoes in equal intervals of range corresponding in length to the spacing of said increments of said pulse, and means for integrating echoes of said pulse increments stored in a plurality of successive range intervals.

11. In an echo energy operative object locator system including means for generating a long pulse of wave energy and directive energy emission means for emitting generated energy in a narrow beam, means for rapidly locating objects throughout 360° of azimuth comprising means for rotating the directive emission means many times during said pulse to project said wave energy over 360° of azimuth and to produce on any one azimuth a train of spaced incremental pulses having the same amplitude as the generated pulse but shorter duration, a plurality of of respective reception means for intercepting echo energy from the reflection of said incremental pulses by objects on respectively different bearings, means for storing the echo energy received by said respective reception means in respective storage devices, means for integrating the energy stored in each of said respective storage devices after the reception of each incremental pulse in said train, and means for continually indicating the magnitude of integrated energy from each of said storage devices.

12. In an echo energy operative object locator system, means for generating a pulse of wave energy, directive wave energy propagation means for emitting said generated wave energy, means for rotating said directive propagation means at a rate having a period small relative to said pulse duration to propagate on any one bearing a series of spaced increments of said pulse, a plurality of angularly disposed directive wave energy reception means for recovering echoes of said emitted energy, means for st storing received echoes in equal intervals of range corresponding in length to the spacing of said increments of said pulse, means for recovering the stored energy in a plurality of range intervals progressively in groups of range increments, with the range increments in any one groups group of the same relative increment in each range interval and successive groups consisting of successive range increments in said range intervals, and means fed by said energy recovering means for integrating the energy recovered in each group of range increments.

* * * * *